June 10, 1969  J. BLAIR  3,448,927
IRRIGATION SPRAY LINE
Filed June 12, 1967
Sheet 1 of 2
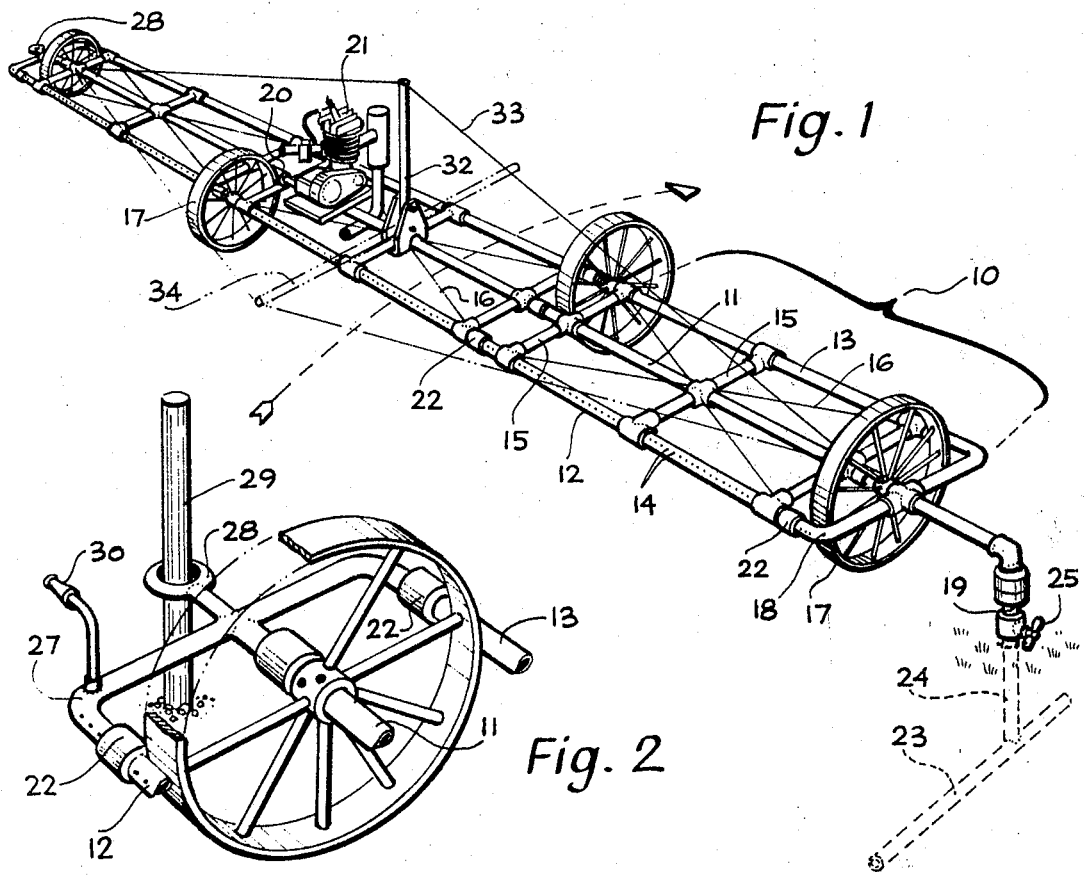
Fig. 1
Fig. 2
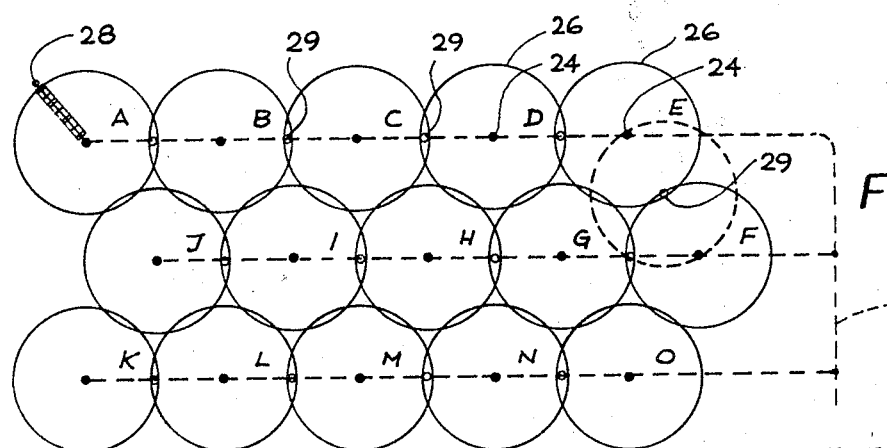
Fig. 3
INVENTOR
JAMES BLAIR
BY MELVILLE, STRASSER, FOSTER & HOFFMAN
ATTORNEYS June 10, 1969          J. BLAIR          3,448,927
IRRIGATION SPRAY LINE
Filed June 12, 1967
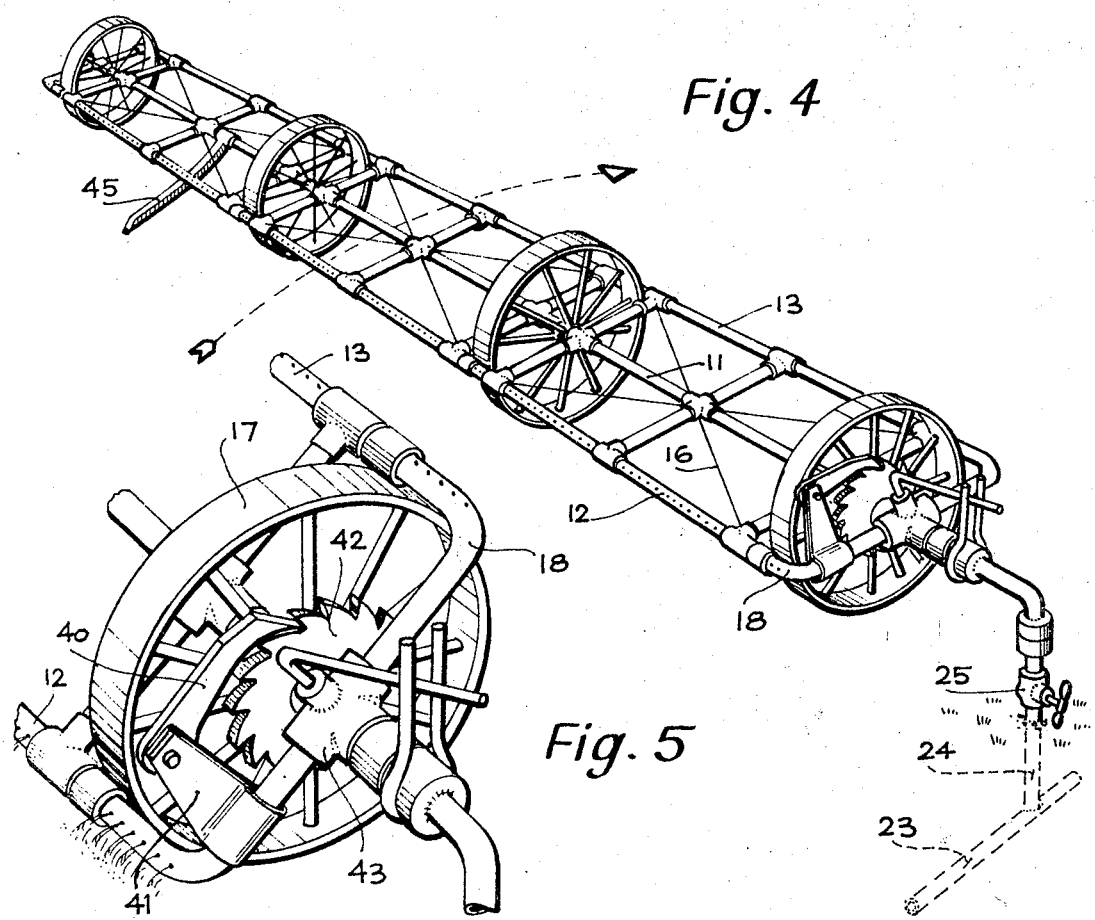
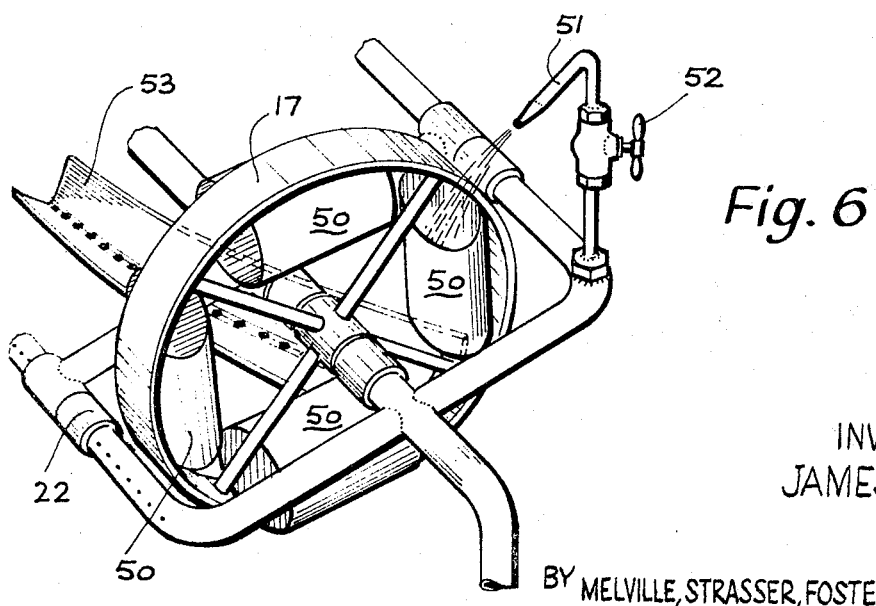
INVENTOR
JAMES BLAIR
BY MELVILLE, STRASSER, FOSTER & HOFFMAN
ATTORNEYS

# United States Patent Office 3,448,927
Patented June 10, 1969

3,448,927
IRRIGATION SPRAY LINE
James Blair, 23 Pembroke St., Eastwood,
New South Wales, Australia
Filed June 12, 1967, Ser. No. 645,241
Claims priority, application Australia, Aug. 22, 1966,
9,994/66
Int. Cl. B05b 3/12, 15/06; A01g 25/02
U.S. Cl. 239—177                                   4 Claims

ABSTRACT OF THE DISCLOSURE

An irrigation spray device comprising a liquid carrying pipe which is part of an elongated frame structure, ground engaging wheels for supporting the frame structure, an inlet connected to the frame structure for conducting water from a supply source to the liquid carrying pipe, spray means on the liquid carrying pipe, and drive means for displacing the spray device in a circular path of travel around the inlet. Additional liquid carrying pipes may be provided in communication with the first mentioned liquid carrying pipe.

---

This invention relates to an irrigation spray device from which water may be arranged to issue at either low or high velocity and in which the device is arranged to pivot around a central delivery pipe or to move in a direction transverse to the length of the pipe.

Portable irrigation pipe lines generally consist of a series of tubes coupled together and thus they lack strength when stressed in a direction transverse to their length. The present invention overcomes this problem by providing a structure which is stiffened laterally to withstand rotating and transverse motion.

The invention is hereinafter described with reference to several preferred embodiments shown in the accompanying drawings in which:

FIGURE 1 is a perspective view of one embodiment of the present invention;

FIGURE 2 is an enlarged view of one distal end supporting structure;

FIGURE 3 is a plan view of one mode of operation of the present invention;

FIGURE 4 is a perspective view of another embodiment of the present invention; and FIGURE 5 is an enlarged view of the input end of the structure shown in FIGURE 4; and FIGURE 6 is an enlarged view of a modification of the structure shown in FIGURE 5.

The spray device is fabricated from one or more sections 10 each of which comprises a central pipe 11 which is flanked on either side by two other pipes 12 and 13, at least one of the side pipes 12 having spray outlets 14 and arranged so that such outlets 14 are normally on the trailing side.

The three pipes are normally arranged in the same horizontal plane and supported by transverse connecting pipes 15 with or without diagonal bracing 16. At least one connecting pipe in each group is hydraulically connected to all three pipes 11, 12 and 13 so that water in the pipes 11 and 13 without spray means 14 will pass to the pipe 12 with the spray means 14, there being at least one ground engaging wheel 17 associated with the section 10 or at least some of the sections of the pipe. A connecting member 18 is provided for the input end of the section or the end section of a series for connecting to a water supply hydrant 19 all of the pipes in a section 10 or in the end section to the hydrant 19. A separate drive assembly 20 powered by an internal combustion motor 21 is provided for transmitting power to a ground engaging wheel 17 for rotating the assembly around the hydrant 19.

Where two or more sections are employed, coupling members 22 are provided on each pipe for coupling to the next section and so on.

Normally the ground engaging wheel 17 for each section is of substantial diameter with its radius almost equal to the distance between the centre pipe 11 and outside pipes 12 and 13.

In the case of a multiple unit assembly some of the ground engaging wheels may be journalled on the outside pipes 12 and 13 to increase stability.

The hydrant 19 is fed from an underground main 23 with a vertical riser 24 and shut off valve 25.

The use of the apparatus is shown diagramatically in FIGURE 3 with a series of selected hydrants 24 and the associated spraying circles 26.

The distal end of the assembly has a pivot member 27 coupled to the pipes 11, 12 and 13 by couplings 22 and having a loop 28 through which a stake 29 passes, the stake being driven into the ground through the loop and then the hydrant coupling 19 removed so that the drive assembly can rotate the assembly through 180° around the stake to bring the connecting member into position with the next hydrant in the series. If desired the transfer from one position to the other say be effected manually.

The sequence of operations from A to N in watering an area is shown in FIGURE 3.

To increase the area of spraying the connecting member 18 may be elongated so that the radius of operation is increased. Furthermore, the outer end or pivot member 27 may be provided with a high pressure spray 30 to spray radially beyond that end and means may be provided at the pumping station to selectively move the pumping means from low pressure to high pressure pumping so as to effectively use such high pressure spray and also the supply to the pipe with the outlets may be shut off during this operation.

The drive assembly 20 may be arranged to attach to any of the ground engaging wheels 17 some of which may have an enlarged surface so as to increase the flexibility of the assembly.

In another construction only two pipes are used and the central pipe 11 is omitted. Furthermore, one or more of the pipes 11, 12 and 13 may be replaced by a non fluid containing member such as a rod.

A mast 32 and brace 33 may be employed to stiffen the sections and the mast may extend vertically as shown at 32 or horizontally as shown at 34. This mast may be swung to either position as desired.

Preferably each section has three transverse members with three longitudinal pipes extending beyond the end cross members 15. At one end the longitudinal pipes 11, 12 and 13 are provided with couplings 22, so that the associated wheel 17 is mounted on one of the longitudinal extensions of the pipes 11, 12 and 13 at the outboard end.

If desired the pipes 11, 12 and 13 may be arranged so that, for example, the trailing pipe 12 has the spray means 14 for the portion closest to the hydrant, the centre pipe 11 has the spray means for the next part of the radius of operation and the leading pipe 13 has the spray means 14 for the remaining radius of operation. Alternatively, the spray means may be as aforementioned associated with one pipe 12 and it is divided into sections to be fed separately by the other pipes 11 and 13 and preferably has an inboard portion which is fed directly from the connecting member so as to even out the pressure drop away from the hydrant and to avoid the use of spray means 14 of varying capacity along the length of the assembly.

In the construction shown in FIGURES 4 to 6 the water flowing through the connecting member 18 to the pipes 11, 12 and 13 is arranged to provide the locomotion of the system. Naturally this may be achieved in a number of ways. As shown in FIGURES 4 and 5 there is provided in a system similar to that shown in FIGURES 1 to 3 a connecting member 18 having a valve which may be positioned so as to selectively divert the water to one side pipe 13 or the other side pipe 12. The side pipe which receives the water therefore becomes heavier and tilts downwards as shown in FIGURE 5 and in so doing operates a ratchet pawl 40 connected to the pipe structure by a bracket 41 and cooperating with a gear 42 on one or more of the wheels 17 or in driving relationship with the wheels so that as the pipe line moves downwards the ratchet pawl contacts the gear and causes the wheel to be displaced part of a turn to move the pipe line forwards. When the displacement is ejected the valve 43 at the inlet end of the dual pipe line system is arranged so as to be weight responsive or directionally responsive and then diverts the water to the other pipe line 13 of the dual pipe line system. This causes the other pipe line 13 to be displaced downwards by its weight towards the ground and the first mentioned pipe line 12 as it drains out in the normal irrigating process becomes lighter and is lifted upwards. The ratchet and pawl system may be duplicated to increase its efficiency.

To prevent the pipe system from running backwards there may be a trailing stake bar 45 which is pivotally connected to the pipe lines 11, 12 or 13 or the wheel structure 17 and is arranged to drag along behind the pipe assembly line as it moves. The stake bar 45 is positioned so that if the pipe line assembly tends to reverse in direction it digs into the ground and prevents such movement. This effect may also be achieved by having a ratchet arrangement between the wheel and the pipe line on which it is mounted. In order to cope with the increasing diameter of the pipe line on a central pivot move system the ratchet arrangement has means for increasing the movement in each cycle by providing a greater or shorter length of stroke of the pawl 40 and/or increasing the diameter of the gear 42.

In another arrangement shown in FIGURE 6 the wheels 17 on which the assembly is mounted are provided with a series of buckets 50 around their periphery and water from the pipe line 12 is arranged to flow into the buckets 50 by an off take 51 and valve 52 so that by their weight as they fill up they cause the wheel 17 to rotate and the assembly to move in the direction of rotation. The water in the buckets when the buckets reach a dumping position may be arranged to be guided through channels 53 or otherwise so as to spread it out below the assembly. This water may only form a small portion of the total water passing through the assembly and therefore will not cause any great inconvenience and the spray means may be arranged so that there are fewer adjacent the wheels to make up for the additional water deposited out of the buckets mounted on the wheels.

I claim:
1. An irrigation spray device which is arranged to move generally transversally of its length, said device comprising spaced liquid carrying pipes which are part of a frame structure, ground engaging wheels for supporting the frame structure, an inlet structure connected to the frame for passing liquid from a supply source to the liquid carrying pipes, spray means on said liquid carrying pipes, and means to displace said device, said device including a plurality of said frame structures each of which is supported by a ground engaging wheel, each pipe having coupling means for attachment to an adjacent pipe of another frame structure, said means for displacing said device including a displaceable weight responsive valve in the inlet structure so that the liquid pipes on each side of the frame are successively filled with liquid and thereby caused to fall and empty and rise and fill, and a pawl and ratchet mechanism operating between the frame and ground engaging wheel to rotate said wheel in response to said rise and fall movement thereby displacing said spray device, each ground supporting wheel being located within the spaced liquid carrying pipes so as to limit the movement of the pipes to a rise and fall movement.

2. A spray device as claimed in claim 1 in which the inlet structure is provided with an extendable member which is provided for connecting it to a liquid hydrant.

3. A spray device as claimed in claim 1 in which the frame structure at the end remote from the inlet structure is detachably connected to a pivot member around which the structure may be rotated when being transferred from one position to another.

4. A spray device as claimed in claim 1 in which the frame structure at the end remote from the inlet structure is detachably connected to a pivot member around which the structure may be rotated when being transferred from one position to another, the said pivot member incorporating spray means to spray liquid beyond the length of the frame.

References Cited

UNITED STATES PATENTS

| 204,695 | 6/1878 | Winebrenner | 239—177 |
| 1,601,199 | 9/1926 | Clapper | 239—213 |
| 2,896,858 | 7/1959 | Price | 239—212 |
| 3,166,088 | 1/1965 | Kern | 239—212 |
| 3,259,319 | 7/1966 | Wallace | 239—177 |

EVERETT W. KIRBY, *Primary Examiner.*

U.S. Cl. X.R.

137—344; 239—212